July 7, 1964   W. R. HARPER, JR   3,140,370
SEALED THERMALLY RESPONSIVE SWITCHING DEVICE
Filed March 17, 1960   2 Sheets-Sheet 1
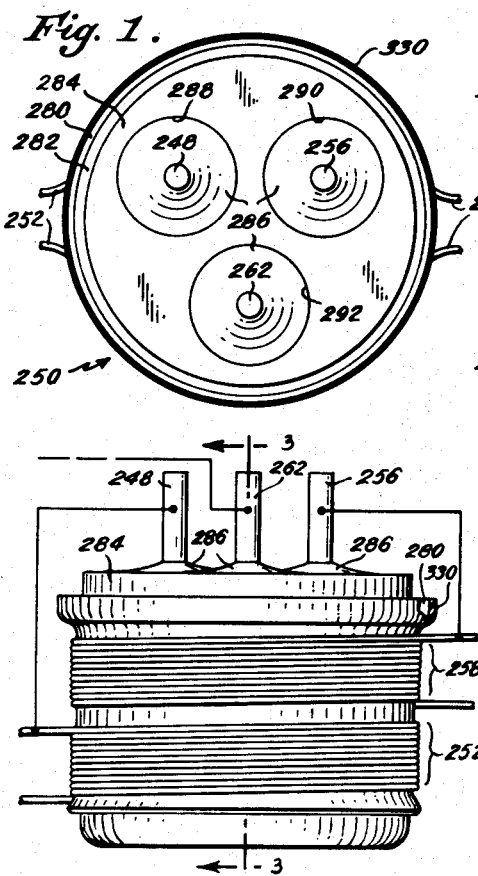
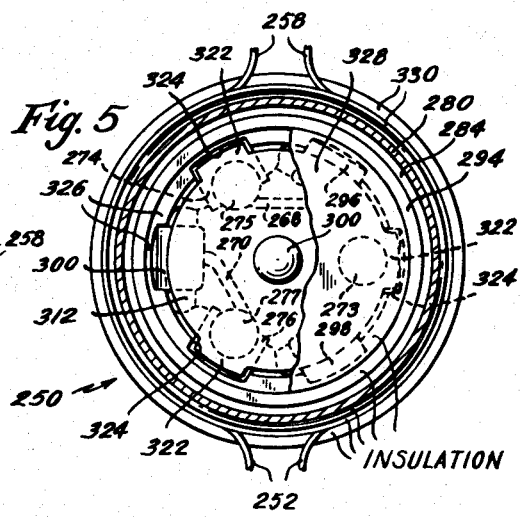
Inventors:
Walter R. Harper, Jr.
by Harold Levine
Att'y.

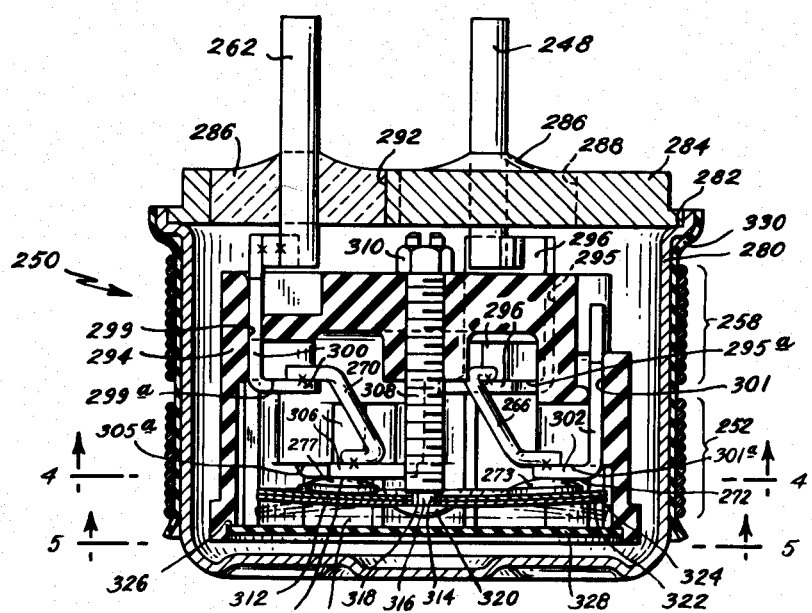
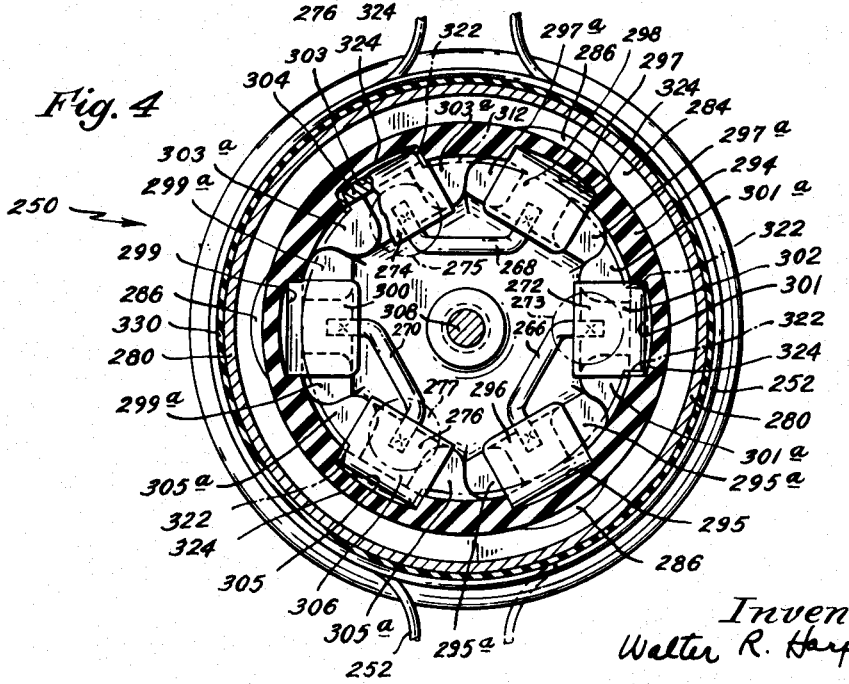

United States Patent Office 3,140,370
Patented July 7, 1964

3,140,370
SEALED THERMALLY RESPONSIVE
SWITCHING DEVICE
Walter R. Harper, Jr., Barrington, R.I., assignor to Texas Instruments Incorporated, Dallas, Tex., a corporation of Delaware
Filed Mar. 17, 1960, Ser. No. 15,715
7 Claims. (Cl. 200—122)

This invention relates to the protection of electric motors and more particularly, to means providing protection against overheating of three-phase type electric motors such as, for example, those which are employed in compressor units and refrigeration systems.

It is one object of the invention to provide such an improved, sealed, thermally-responsive device which is relatively compact and inexpensive.

It is another object of this invention to provide an improved, sealed, thermally-responsive protective device which is adapted to protect three-phase electric motors against deleterious overheating.

Another object is to provide hermetically sealed motor protectors which afford substantially uniform response on a production basis.

Among the further objects of the instant invention are the provisions of a hermetically sealed motor protector which is durable, accurate, reliable in operation, compact, which is versatile and susceptible to varying electrical ratings in diverse applications, which employs a minimum number of parts and which is simple and economical to manufacture.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the accompanying drawings, in which one of the various possible embodiments of the invention is illustrated:

FIG. 1 is a top plan view of a thermally responsive switch;

FIG. 2 is an elevational view thereof;

FIG. 3 is a sectional view taken along line 3—3 in FIG. 2; and

FIGS. 4 and 5 are sectional views taken along lines 4—4 and 5—5, respectively, in FIG. 3.

Referring now to the drawings, there is illustrated a thermally responsive switch generally referred to by numeral 250. Thermally responsive switch 250 includes a cup-shaped casing member 280 formed of a material having a comparatively high thermal conductivity. Casing member 280 provides an internal shoulder 282 for the reception of a radially outer marginal portion of a header or casing cover member 284. The mutually contiguous portions of cup-shaped member 280 and header 284 are sealed to each other such as by welding. A section of glass 286 is bonded to the mutually adjacent portions of header member 284 and each of terminals 248, 256 and 262, thereby to support these terminals within apertures 288, 290 and 292, respectively, of the header member with a conventional glass-to-metal seal.

Disposed within the casing provided by casing member 280 and header 284 is a generally cup-shaped member designated by the reference numeral 294. Cup-shaped member 294 is formed of a conventional moldable electrical insulating material and is provided with a plurality of apertures 295, 297, 299 and adjacent shoulders 295a, 297a and 299a. Each set of apertures and shoulders 295, 295a; 297, 297a; and 299, 299a; respectively, cooperatively interfits with and fixedly mounts an electrically conductive member 296, 298 and 300, respectively. Members 296, 298 and 300 each include solid, electrically conducting strap members 293 which are electrically connected thereto, as by welding or the like. Each of strap members 293 are in turn electrically connected and secured to a respective terminal 248, 256 and 262, as by welding whereby terminals 248, 256 and 262 support and suspend the switching mechanism within casing 280.

As best seen in FIGS. 3 and 4, terminals 248, 256 and 262 mount and suspend the switching mechanism within casing 280 and provide an arrangement whereby cup-shaped member 294 and consequently the switching device, is substantially free of area contact with the inner side walls of the thermally conductive cup-shaped member 294 and whereby an air space is provided between the casing 280 and cup-shaped member 294 as best seen in FIGS. 3 and 4. By area contact is meant appreciable surface area-to-area contact. Although this arrangement may permit point or line contact between cup member 294 and casing 280, such point or line contact is relatively inconsequential for reasons explained below.

Terminals 248, 256 and 262, by suspending the cup member 294 and switching device within casing 280 in the manner described above, advantageously obviates heat concentrations on any one portion of the switching device, and permits mass production of these devices which have substantially uniform ratings and substantially uniform performance characteristics. Such uniform performance would be difficult to obtain with area surface contact between the cup member and the casing member since the amounts of surface contact might vary between different protectors in the same production run, and thus result in varying rates of heat transfer between the casing 280 and the thermal switching device.

Cup-shaped member 294 is provided with another set of apertures 301, 303 and 305 and shoulders 301a, 303a and 305a alternately spaced between said apertures 295, 297, 299 and shoulders 295a, 297a and 299a and at a lower elevation, as seen in FIG. 3. Each set of apertures and shoulders 301, 301a; 303, 303a; and 305, 305a interfits with and receives respectively, contact providing members 302, 304 and 306. Each of members 302, 304 and 306 includes a turned-over portion providing respectively contacts 272, 274 and 276. In a suitable manner, as by welding or the like, internal electric heater 266 electrically connects contact 272 with member 296, internal electric heater 268 electrically connects contact 274 with member 298, and internal electric heater 270 electrically connects contact 276 with member 300.

Thermally responsive switch 250 further includes a thermally responsive device 312 carrying three spaced and movable contacts 273, 275 and 277 for engagement respectively with stationary contacts 272, 274 and 276.

Thermally responsive device 312 and thermally responsive switch 250 may take the form of a conventional thermostatic disc. Disc 312 may be formed in a well-known manner with at least two layers or components, one having a higher coefficient of thermal expansion than the other so that upon heating thereof, the disc snaps from one position of stability to the other. Upon cooling thereof, the disc will snap back to the opposite position of stability. The high expansion layer or component of the disc 312, as viewed in FIG. 3, is uppermost whereupon the disc snaps from the full-line position shown in FIG. 3 to the broken-line position upon heating to a predetermined temperature and snaps back to the said full-line position upon cooling to a predetermined temperature.

Thermally responsive device 312 may, and often does, have sufficient electrical resistance to cause heating thereof due to the flow of current therethrough.

As best seen in FIG. 3, a post 308 is fixedly secured in threaded engagement with cup-shaped member 294 by means of a lock nut 310. Thermally responsive device 312 provides a substantialy centrally located aperture 314 within which is disposed a reduced diameter portion 316 of the post 308. Thermally responsive device 312 is loosely confined between an adjacent shoulder 318 and a headed end 320 provided by the post. Substantial rotation of thermally responsive device 312 about the axis of post 308 is prevented by a plurality of ears 322 projecting radially outwardly from the disc and loosely interfitting with mating recesses 324 provided by cup-shaped member 294, as best seen in FIG. 4. The open end of cup-shaped member 294 is further provided with a shoulder 326, as seen in FIG. 3, for the reception of a circular member 328 formed of electrical insulating material and cemented in place about its periphery to shoulder 326.

Thermally responsive switch 250, for example, may be provided with a thin film 330 of electrical insulating material wrapped about the outer surface of casing member 280 and with external heaters 252 and 258 wrapped about the thin insulating layer and in thermally conductive juxtaposition to the casing 280. Heaters 252 and 258 may be provided with an external electrically insulating layer. Thermally responsive switch 250, when provided with the insulating layer 330 and external heaters 252 and 258, is adapted to be employed in a circuit and arrangement in a compressor unit such as that disclosed and described in a copending application, Serial No. 803,282 filed March 31, 1959, which matured as U.S. Patent No. 3,023,350 on February 27, 1962, and is assigned to the assignee of the instant application.

It will be understood that the thermally responsive switch 250 may be mounted against the windings of a motor to be protected or otherwise in good heat-transfer relation therewith such as, for example, by being mounted against the end bell of the motor.

The terms "sealed" and "hermetically sealed" as employed throughout the specification and claims are intended to include sealing against entry of at least one or more of the following, individually or in combination: moisture, refrigerant gases and fluids, impregnating media such as varnishes, resins or the like and their vapors, lubricants and fuels and their vapors and other deleterious substances.

In view of the above, it will be seen that the several objects of the invention are achieved and other advantageous results attained.

Dimensions of certain of the parts as shown in the drawings have been modified for the purpose of clarity of illustration.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. A hermetically sealed, three-phase thermally responsive switch comprising a thermally conductive cup-shaped casing member; a thermally responsive electrical switching device disposed in said cup-shaped member; the interior dimensions of said casing member being greater than the exterior dimensions of said switching device; said switching device comprising three pairs of electrical contacts; snap-acting thermally responsive means; means mounting one contact of each pair of said three pairs of contacts for movement toward and away from the other contact of each pair of said three pairs of contacts in response to movement of said snap-acting thermally responsive means at predetermined temperature conditions; header means including three electrical terminals projecting on opposite sides thereof in sealed relation to said header means; said header means closing the open end of said member and secured thereto sealing said cup-shaped member; electrically conductive means connecting each of the respective other contacts with said terminals and mounting and suspending said switching device within said casing member substantially without surface area contact between said switching device and said casing member; and said switching device including heater means provided for said snap-acting thermally responsive means and electrically connected with at least two pairs of said three pairs of contacts.

2. The switch as set forth in claim 1 and wherein said thermally responsive means comprises a snap-acting thermostatic plate and said one contact of each pair of said three pairs of contacts being mounted at spaced portions of said plate.

3. A hermetically sealed three-phase thermally responsive electrical switch comprising a switch housing; switch means mounted on said housing; said switch means including three pairs of electrical contacts; said switch means including a snap-acting thermally responsive device mounted on said housing; said snap-acting device being electrically connected to and mounting one contact of each of said three pairs of electrical contacts at spaced portions thereof for movement into and out of engagement with the respective other contact of each pair of said three pairs of contacts in response to movement of said snap-acting device at predetermined temperature conditions; each of said other contacts of each pair of said three pairs of contacts being respectively mounted on said switch housing; said housing and switch means being entirely disposed within a thermally conductive cup-shaped casing member having an open end; the peripheral dimensions of the interior of said cup-shaped casing member being greater than those of the exterior of said switch housing; header means secured to and hermetically sealing the open end of said cup-shaped thermally conductive casing member; said header means mounting three electrical terminals in mutually spaced, electrically insulated relation; each of said terminals projecting exteriorly and interiorly of said cup-shaped casing member; means electrically connecting respective ones of each of said other contacts of said three pairs of contacts to a respective one of said terminal members; said electrically connecting means including electrically conductive strap members mounting and suspending said switch housing and switch means within said cup-shaped thermally conductive casing member substantially without surface area contact between said casing member and said switch housing, and between said casing member and switch means.

4. The switch as set forth in claim 3 and wherein said last-named means electrically connecting said other contacts of said three pairs of contacts to respective ones of said terminal members also includes electrical heater means having substantial electrical resistance, electrically connected between at least two of said other contacts of said three pairs of contacts and the respective electrically conductive strap members.

5. The switch as set forth in claim 3 and wherein said electrical terminals are mounted on said header means with a glass-to-metal seal.

6. A hermetically sealed thermally responsive electrical switch comprising a switch housing formed of electrically insulating material; switch means incorporating first and second electrical contacts; said first electrical contact being electrically connected to a first electrically conductive terminal mounted on said housing and having a portion thereof extending exteriorly of said housing; said switch means further including a snap-acting thermally responsive device mounted on said housing; said snap-acting device mounting and being electrically connected to said second contact for movement thereof into and out of engagement with said first contact in response to movement of said snap-acting device at predetermined temperature conditions, said second contact being electrically connectible with a second terminal mounted on said housing, said second terminal having a portion thereof extending exteriorly of said housing; said housing, contacts and thermally responsive device mounted thereon being entirely disposed within a thermally conductive casing member having an open end, the interior dimensions of said casing member being greater than the exterior dimensions of said switch housing; header means secured to and hermetically sealing the open end of said casing member; said header means mounting third and fourth electrically conductive terminals in mutually spaced, electrically insulated relation; each of said third and fourth electrical terminals having a portion projecting exteriorly and interiorly of said casing member; each of the interiorly projecting portions of said third and fourth terminal members being secured and electrically connected to a respective one of the portions of said first and second terminals projecting exteriorly of said housing to mount and suspend said switch housing and switch means within said casing member substantially without surface area contact between said casing member and switch housing and between said casing member and switch means whereby to provide an air space between said casing member and switch means and between said casing member and switch housing.

7. A hermetically sealed thermally responsive electrical switch comprising a thermally conductive casing member; a thermally responsive electrical switching device disposed in said casing member; the interior dimensions of said casing member being greater than the exterior dimensions of said switching device; said switching device including switch means having first and second electrical contacts; said switch further including snap-acting thermally responsive means; means mounting said first contact for movement toward and away from said second contact in response to movement of said snap-acting thermally responsive means at predetermined temperature conditions; header means including a pair of electrical terminals projecting on opposite sides of and in sealed relation to said header means; said header means closing the open end of said casing member and secured thereto sealing said casing member; electrically conductive means connecting each of said first and second contacts with said terminals and mounting and suspending said switching device within said casing member substantially without surface area contact between said switching device and said casing member.

References Cited in the file of this patent

UNITED STATES PATENTS

| | | |
|---|---|---|
| 1,705,690 | Thomas | Mar. 19, 1929 |
| 1,763,137 | Dorfman | June 10, 1930 |
| 1,783,179 | Matthews | Dec. 2, 1930 |
| 2,354,529 | Ludwick | July 25, 1944 |
| 2,475,300 | Webb | July 5, 1949 |

UNITED STATES PATENT OFFICE
CERTIFICATE OF CORRECTION

Patent No. 3,140,370                                  July 7, 1964

Walter R. Harper, Jr.

It is hereby certified that error appears in the above numbered patent requiring correction and that the said Letters Patent should read as corrected below.

Column 4, after line 67, insert

6. The switch as set forth in claim 5 and wherein said switch housing is formed of electrically insulating material; said cup-shaped casing member and header means being formed of a thermally conductive metal; said header means being welded to said cup-shaped member to hermetically seal said switch means within said cup-shaped casing.

line 68, "6." should read -- 7. --. Column 5, line 31, "7." should read -- 8. --. In the heading to the printed specification, line 8, "7 Claims" should read -- 8 Claims --.

Signed and sealed this 21st day of October 1969.

(SEAL)
Attest:

EDWARD M. FLETCHER, JR.                    WILLIAM E. SCHUYLER, JR.
Attesting Officer                            Commissioner of Patents